United States Patent Office 3,636,057
Patented Jan. 18, 1972

3,636,057
COLOR STABILIZER FOR MALEIC ANHYDRIDE
Jesse Wehrman, Houston, Tex., assignor to Petro-Tex Chemical Corporation, Houston, Tex.
No Drawing. Filed Aug. 21, 1969, Ser. No. 852,088
Int. Cl. C07c 57/14
U.S. Cl. 260—346.8
20 Claims

ABSTRACT OF THE DISCLOSURE

High temperature color stable maleic anhydride can be obtained by adding trace amounts, i.e., 50–2000 p.p.m. of an hydrocarbyl thiophosphate of the structure

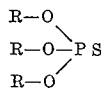

to the maleic anhydride where R is a hydrocarbon radical having 1 to 15 carbon atoms. For example maleic anhydride containing 560 p.p.m. of triethyl thiophosphate maintained at 140° for 24 hours had a color of 10–15 (Hazen) whereas unstabilized maleic anhydride had a color of 300+ (Hazen).

---

This application relates to maleic anhydride which is color stabilized for high temperature uses with an hydrocarbyl thiophosphate.

Maleic anhydride is a widely used chemical intermediate. It is used in the preparation of a wide variety of polyester resins for molding and coating. Maleic anhydride has been a traditional Diels-Alder reactant. Maleic anhydride addition to conjugated dienes by the Diels-Alder mechanism and substitution addition reactions with olefin containing reactant provide increased functionality of polymeric coating compositions such as those prepared from such long chain fatty acids as tall oil, cotton seed fatty acid, linseed oil, rosin and the like. Maleic adducts of polymerized resinous systems, esterified and sulfonated find use as wetting and sudsing agents. Maleic anhydride is an epoxy curing agent.

In many of the utilities in which maleic anhydride is employed it is subjected to high temperatures and without stabilization it can discolor. Although in some applications the discoloration is not problem, in many others it is a considerable draw back to the use of maleic anhydride, for example, in clear coatings or moldings which are heat cured. Color stability is also important since maleic anhydride is often shipped and stored in a molten state usually at temperatures of 60 to 80° C. Moreover, careless handling can result in excessive temperatures, i.e. 150° C. or more for extended periods of time. To protect the color of the maleic anhydride under these conditions there must be a suitable stabilizer.

Since maleic anhydride is employed in a wide variety of uses because of its particular and predictable behavior on specification, any additive must not detract from these properties or have side effects which depreciate the maleic anhydride or the products prepared therefrom. This unobtrusiveness should of course, be inherent in any functional material added to the maleic anhydride. However, any functional material will have a degree of contaminating effect and modification; thus, it is most desirable that the functional additive be employed in the smallest quantity possible. Preferably the additive is employed in what is described as a "trace amount." By the use of such small quantities of functional materials the integrity of the maleic anhydride is preserved.

Briefly stated, the present invention is a composition comprising maleic anhydride and a color stabilizing amount of hydrocarbyl thiophosphate having the structure

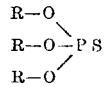

where R is a hydrocarbon radical having 1 to 15 carbon atoms.

Normally, the maleic anhydride employed in the present invention will be of very high purity in order that the initial color is of a high order. Generally, the purity of the anhydride will be around 90 percent to obtain the benefits of the present invention. The present invention is particularly useful with what may be called "specification grade" maleic anhydride which is generally understood to mean purity of at least 99.5 percent. Specification grade maleic anhydride will have very good initial color, e.g. 20 (Hazen) or less.

The thiophosphates of the invention are prepared by conventional methods, for example, as shown in Phosphorus and Its Compounds, vol. II, John R. Van Wazer, Interscience Publishers, Inc. 1961, N.Y., pp. 1257–1262. The hydrocarbon radical can be any hydrocarbon radical or combination of radicals, for example, alkyl, cycloalkyl, aryl, aralkyl, alkaryl and polycycloalkyl. Each R must be a hydrocarbon radical; although each R can be different. Some R groups are ethyl, phenyl, phenyl phenyl, t-butyl, phenyl, benzyl, tolyl, naphthyl, cyclohexyl, cyclopentyl, cycloheptyl, bicyclo (2,2,1) heptyl, adamantyl, etc. Various compounds include tributylphosphate, 2-t-butyl phenyl, diethyl thiophosphate, triphenylthiophosphate, dicyclohexyl phenyl thiophosphate, diadamantyl ethyl thiophosphate, 1,3-dimethyl adamantyl diisopropyl thiophosphate and the like. The alkyl thiophosphate added to the maleic anhydride can be a single alkyl thiophosphate or a mixture thereof. Suitable alkyl groups are, for example, methyl, ethyl, butyl, amyl, heptyl, decyl, isopropyl, isobutyl, isoamyl, 2-ethyloctyl, 2,4-dimethyloctyl and the like. Some suitable alkyl thiophosphates would include trimethylthiophosphate, triethylthiophosphate, tributylthiophosphate, tridecylthiophosphate and the like.

The thiophosphate is added to the maleic anhydride while the anhydride is in the molten state. This is usually around 60° C. (M.P. 52.4–52.8° C.) although lower or higher temperatures can be used. The thiophosphate is added directly to the molten maleic anhydride with agitation. Under these conditions the solution of the small amount of thiophosphate is very rapid.

The amount of thiophosphate employed is very small. Preferably the smallest quantity which will give acceptable color stability is employed. Substantial color stability improvement can be noted with as little as 50 p.p.m. of thiophosphate. However, more significant improvement is observed at about 100 p.p.m. to about 2000 p.p.m. at which point there is a decline in the effectiveness of the stabilizer. Preferably about 150 to 1500 p.p.m. of thiophosphate are employed and even more preferably about 300 to 1000 p.p.m. In any event the amount of thiophosphate employed is such as to be insufficient to adversely effect the properties of the maleic anhydride.

After addition of the thiophosphate, the maleic anhydride can be maintained in the molten state or solidified and prepared in the usual manner in the form of briquettes, flakes, powders and the like.

The benefits of the present invention are obtained when the maleic anhydride in the normal course of handling the utilization is subjected to elevated temperatures. By the phrase "elevated temperatures" is meant temperatures above the melting point of maleic anhydride, i.e., about 52.4° C. There are, however, benefits to be derived at lower temperatures; for example, from room temperature (approximately 25° C.) upward since even at these relatively low temperatures there is some color deterioration over long periods of time. The upper limit of applicability of the stabilization is the point at which the maleic anhydride undergoes decomposition or charring, generally around 180° C.

The following example will illustrate the practice of the present invention and the benefits to be derived therefrom.

EXAMPLE

A series of runs was made using commercial maleic anhydride having the following specification:

Assay—99.5 percent minimum
Freezing Point—52.5° C. minimum
Color [1]—20 Hazen maximum
Xylene insoluble—None

[1] This sample has practically no color, i.e. less than 10.

and triethyl thiophosphate as the color stabilizing material. The maleic anhydride was placed in a test tube at 60° C. and triethylthiophosphate added and dissolved in the quantity indicated in the table. The temperature of the molten material was then raised to 140° C. and held there for 24 hours at which time the color was determined.

The standard use to indicate the quantity or intensity of color of the products in the molten or liquid form is known as the APHA standard color test. This test is one developed by the American Public Health Association which is known as the Hazen Platinum-Cobalt Scale which is described in "Standard Methods of Chemical Analysis," Wilford W. Scott, 5th edition, page 2048. To determine the color, a molten sample is poured into a 50 ml. tall form Nessler tube and compared with APHA color standards using a matte white background in diffused daylight.

TABLE

| Run | Maleic anhydride, grams | Triethylthiophosphate | | Color hazen |
|---|---|---|---|---|
| | | Grams | P.p.m. | |
| 1 | 135.0 | 0 | 0 | 300+ |
| 2 | 135.0 | .0181 | 140 | 30 |
| 3 | 135.0 | .0386 | 280 | 20 |
| 4 | 135.0 | .0772 | 560 | 10–15 |
| 5 | 135.0 | .1554 | 1,120 | 25 |
| 6 | 135.0 | .1930 | 1,420 | 20 |
| 7 | 135.0 | .2316 | 1,720 | 30 |

It can be readily seen that there is a substantial improvement in the high temperature color stability of maleic anhydride by the addition of small quantities of an alkyl thiophosphate. No change in the other properties or functioning of the maleic anhydride were observed or known as a result of the addition of alkylthiophosphates.

The invention claimed is:

1. A composition consisting essentially of maleic anhydride and a small color stabilizing amount of hydrocarbyl thiophosphate having the structure

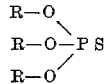

where R is a hydrocarbon radical having 1 to 15 carbon atoms.

2. The composition according to claim 1 wherein there is at least 50 parts per million of the thiophosphate.

3. The composition according to claim 2 wherein there is 100 to 2000 parts per million of the thiophosphate.

4. The composition according to claim 3 wherein there is 150 to 1500 parts per million of the thiophosphate.

5. The composition according to claim 4 wherein there is 300 to 1000 parts per million of the thiophosphate.

6. The composition according to claim 1 wherein each R is an alkyl radical.

7. The composition according to claim 6 wherein R is ethyl.

8. The composition according to claim 6 wherein there is at least 50 parts per million of the trialkylthiophosphate.

9. The composition according to claim 8 wherein there is 100 to 2000 parts per million of the trialkylthiophosphate.

10. The composition according to claim 9 wherein there is 150 to 1500 parts per million of the trialkylthiophosphate.

11. The composition according to claim 10 wherein there is 300 to 1000 parts per million of the trialkylthiophosphate.

12. The composition according to claim 1 wherein there is at least 90 percent maleic anhydride.

13. The composition according to claim 12 wherein there is at least 99.5 percent maleic anhydride.

14. The composition according to claim 13 wherein each R is an alkyl radical.

15. The composition according to claim 14 wherein R has 1 to 6 carbon atoms.

16. The composition according to claim 15 where R is ethyl.

17. The composition according to claim 16 wherein there is at least 50 parts per million of triethylthiophosphate.

18. The composition according to claim 17 wherein there is 100 to 2000 parts per million of triethylthiophosphate.

19. The composition according to claim 18 wherein there is 150 to 1500 parts per million of triethylthiophosphate.

20. The composition according to claim 19 wherein there is 300 to 1000 parts per million of triethylthiophosphate.

References Cited

UNITED STATES PATENTS 3,115,477  12/1963  Bowman et al. ____ 260—346.8

ALEX MAZEL, Primary Examiner

B. I. DENTZ, Assistant Examiner